United States Patent
Kawsar et al.

(10) Patent No.: US 10,070,290 B2
(45) Date of Patent: Sep. 4, 2018

(54) SYSTEM AND METHOD FOR SCHEDULING BACKGROUND SYNCHRONIZATION OF APPLICATION DATA

(71) Applicant: Alcatel Lucent, Boulogne Billancourt (FR)

(72) Inventors: Fahim Kawsar, Antwerp (BE); Utku Gunay Acer, Antwerp (BE)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 15/313,240

(22) PCT Filed: May 19, 2015

(86) PCT No.: PCT/EP2015/061016
§ 371 (c)(1),
(2) Date: Nov. 22, 2016

(87) PCT Pub. No.: WO2015/181001
PCT Pub. Date: Dec. 3, 2015

(65) Prior Publication Data
US 2017/0188177 A1 Jun. 29, 2017

(30) Foreign Application Priority Data

May 26, 2014 (EP) .................. 14290153

(51) Int. Cl.
*H04M 11/00* (2006.01)
*H04W 4/60* (2018.01)
(Continued)

(52) U.S. Cl.
CPC ........... *H04W 4/60* (2018.02); *H04L 67/1095* (2013.01); *H04M 15/88* (2013.01); *H04W 4/003* (2013.01); *H04W 4/028* (2013.01); *H04W 4/029* (2018.02)

(58) Field of Classification Search
None
See application file for complete search history.

(56) References Cited

U.S. PATENT DOCUMENTS

| 5,881,231 A | 3/1999 | Takagi et al. |
| 2003/0065712 A1* | 4/2003 | Cheung .............. H04L 29/06 709/203 |

(Continued)

FOREIGN PATENT DOCUMENTS

| JP | H 08-241257 | 9/1996 |
| JP | 2005-148901 | 6/2005 |
| JP | 2013-235339 | 11/2013 |

OTHER PUBLICATIONS

Arjan Peddemors et al., Predicting mobility events on personal devices, Science Direct, Pervasive and Mobile Computing 6, pp. 401-423, 2010.

(Continued)

*Primary Examiner* — Erika Washington
(74) *Attorney, Agent, or Firm* — Fay Sharpe LLP

(57) ABSTRACT

A system (1) for scheduling background synchronization of application data (2) between a mobile communication device (3) and a cloud storage (4), comprising: —a collecting unit (100) estimating the size of application data (2); —a prediction unit (101) adapted to predict future locations (300) of the mobile communication device (3) at future times (301); —a cost module (102) adapted to calculate a cost of transfer (5) at future times (301) and future locations (300); and —a scheduler (103) adapted to schedule the background synchronization at a future time (311) based on cost of transfer (511).

10 Claims, 10 Drawing Sheets

(51) Int. Cl.
*H04W 4/00* (2018.01)
*H04W 4/02* (2018.01)
*H04L 29/08* (2006.01)
*H04M 15/00* (2006.01)
*H04W 4/029* (2018.01)

(56) References Cited

U.S. PATENT DOCUMENTS

2011/0029670 A1    2/2011  Klein et al.
2013/0151693 A1*   6/2013  Baker ..................... H04L 67/18
                                                          709/224
2014/0289376 A1*   9/2014  Chan ....................... H04L 69/04
                                                          709/219

OTHER PUBLICATIONS

International Search Report for PCT/EP2015/061016 dated Jun. 26, 2015.

* cited by examiner

SYSTEM AND METHOD FOR SCHEDULING BACKGROUND SYNCHRONIZATION OF APPLICATION DATA

FIELD OF THE INVENTION

The present invention generally relates to a system and the related method for scheduling background synchronization of data from an application between a mobile communication device whereon said application is running and cloud storage, i.e. remote storage typically in data centres hosted by a party different from the mobile device user.

A mobile application, or app, is application software designed to run on smartphones, tablet computers, laptops, personal computers and any other mobile devices with data connectivity. Mobile applications were originally offered for general productivity and information retrieval, including email, calendar, contacts, and stock market and weather information. However, public demand and the availability of developer tools drove rapid expansion into other categories, such as mobile games, factory automation, GPS and location-based services, banking, order-tracking, ticket purchases and recently mobile medical applications.

Cloud storage is a model of networked enterprise storage where data is stored in virtualized pools of storage which are generally hosted by third parties. Hosting companies operate large data centres, and application providers who require their data to be hosted buy or lease storage capacity from them. The data centre operators, in the background, virtualize the resources according to the requirements of the customer and expose them as storage pools, which the customers can themselves use to store files or data objects. Physically, the resource may span across multiple servers and multiple locations. The safety of the files depends upon the hosting companies, and on the applications that leverage the cloud storage. Cloud storage services may be accessed through a web service application programming interface (API) or by applications that utilize the API, such as cloud desktop storage, a cloud storage gateway or Web-based content management systems.

Users of mobile applications reach their content online via multiple devices and application developers make use of their systems in the cloud. The content of the mobile application is therefore maintained in the cloud servers as well as in mobile communication devices locally. Once an application adds/modifies/deletes the content locally on a mobile communication device, the changes to the content are synchronized with the cloud store and with other devices. This synchronization takes place in the background without the user of the device noticing.

BACKGROUND OF THE INVENTION

When a mobile communication device captures for example a photo, or a video, the item can be synchronized with the cloud, and is for instance automatically synchronized with other devices. Downloading through cellular connection might however lead the user to run out of his quota of cellular connection, or might result in high costs for the user in terms for example of money, energy consumption, time, etc. The problem intensifies when the user is roaming.

Mobile application developers indicate their preferences about synchronization process in the application policy. For example, on the 12 Jul. 2012, the New York Times and the Research and Development Lab jointly launched a secure data locker for personal location information application under the name OpenPaths (https://openpaths.cc). The purpose of the application is to gather personal location information for personal use as well as to enable sharing of this information for purposes of research. In addition to the location information, the time at which the location information is gathered is also recorded. The OpenPaths app runs in the background of the mobile communication device and is designed to have minimal impact on battery life. Rather than reporting the position of the mobile communication device continuously via GPS, the app logs any "significant" change in location as determined by the device APIs. The app allows visualization of the location history of the device, and periodically syncs any recorded data with the OpenPaths servers. As the background synchronization of location and time information is scheduled periodically, the user of the mobile communication device might run out of his quota of cellular connection. There exists also a risk for excessive costs generated by the transfer of the information in terms for example of money, syncing time, etc. Auto-sync can be manually turned off by the user. This requires the manual intervention of the user, and a consequence thereof is that the device and cloud storage will no longer be synchronized.

Most mobile communication devices with data connectivity provide the user with the ability to use a Wi-Fi network exclusively for background application synchronization. However, this method is invasive and requires the intervention of the user. He might not be allowed to connect to a network if he does not have permission. A Wi-Fi connection might also be over-subscribed, i.e. might present issues such as high congestion, low signal power, etc. These issues could result in high costs for the user. The synchronization might for example last longer than wanted. Furthermore, by the time a user finds a Wi-Fi network he can connect to, the update of the application might be out-dated and not relevant anymore.

It is an objective of the present invention to disclose a system and the related method that overcome the above identified shortcomings of existing tools. More particularly, it is an objective to disclose such a system and method for scheduling background synchronization of application data between a mobile communication device and a cloud storage, with reduced risk for slow or even outdated synchronization, and with reduced risk for excessive costs. It is a further objective to disclose such a system that enables the scheduling of a background synchronization of an application data in a fast and efficient manner.

SUMMARY OF THE INVENTION

According to a first aspect of the present invention, the above defined objectives are realized by a system for scheduling background synchronization of application data between a mobile communication device and a cloud storage, the system comprising:
- an information collecting unit adapted to obtain or estimate the size of application data;
- a location prediction unit adapted to predict future locations of the mobile communication device at future times;
- a cost determination module adapted to calculate a cost of transfer for transferring application data at the future locations and at the future times; and
- a synchronization scheduler adapted to schedule the background synchronization at a future time based on cost of transfer, for example, the future time with a lowest cost.

In accordance with the present invention, the cloud storage may for example be a server in the cloud on which application data is stored and from which or to which application data is synchronized. According to the present invention, the mobile communication device may for example be a mobile phone, or a tablet, or a laptop, or a personal computer or any other device with data connectivity. The mobile communication device is adapted to communicate with the cloud storage. Application data can be stored on the mobile application device and/or on the cloud storage. For example, once an application adds, modifies or deletes content, the content including the changes is synchronized with the cloud storage, and the cloud storage then updates the content on the other associated mobile communication devices. The information collecting unit of the system according to the present invention may retrieve the amount of application data that needs synchronizing from the mobile communication device, or from the cloud storage, or from the mobile communication device and the cloud storage. As soon as synchronization of application data is needed, the location prediction unit predicts future locations of the mobile communication device at future times. This prediction is an estimation of the location of the mobile communication device in the future. It may be realized by taking a past behaviour of the user of the mobile communication device into account. For example, the time schedule and the geographical location of the user of the mobile communication device may be monitored. The location prediction unit of the system according to the present invention may for instance become aware of a probability of times and locations of the mobile communication device based on the monitored behaviour of a user of the mobile communication device, and may thereby predict future times and future locations based on this probability. This way, experience from the user of the mobile communication device is taken into account in the predictions as feedback and brings credibility to their determination, making them more relevant.

The cost determination module according to the present invention calculates a cost of transfer for the background synchronization of application data when the synchronization is initiated at predetermined future times predicted by the location prediction unit. For example, the type of connection between the cloud storage and the mobile communication device may vary depending from one predicted time to another, and this may impact the cost of transfer of application data. The information collecting unit of the system according to the present invention further estimates the size of application data. This way, the system according to the present invention is able to profile and estimate the amount of application data, and is able to identify requirements for the transfer based on the amount of application data to be transferred. The size of application data may as a consequence be taken into account during the calculation of a cost of transfer. The synchronization scheduler according to the present invention identifies a future time, out of all the predicted future times, for which the cost of transfer of the background synchronization of application data is the lowest. This way, the background synchronization of application data is delayed so that it takes place at the time, and the location of the mobile communication device, when the cost associated with the background synchronization is minimized. This way, as the cost of transfer for the user of the mobile communication device is the lowest, several characteristics associated with the background synchronization are minimized, for example the time needed for the transfer, the financial cost of the transfer for the user, the use of the battery level of the mobile communication device and/or the cloud storage, the usage of the bandwidth of both devices, etc.

According to an optional embodiment, the system according to the present invention further comprises:
  a rescheduling module adapted to receive overruling instructions from a user of the mobile communication device to reschedule the background synchronization at a time different from the future time.

According to the present invention, a user of the mobile communication device is able to decide whether or not the background synchronization of application data can go through. After the start of a background synchronization, the rescheduling module according to the present invention may receive overruling instructions from the user. This way, the user is able to suspend the on-going background synchronization of application data, when for example the user judges the cost of transfer too high for the transfer of this application data, or for example when the user knows beforehand that the mobile communication device will not be at the future time at the predicted location. The user is also able to reschedule the background synchronization at a new future time different from the future time, which is more convenient for the user for the synchronization of application data. This way, the user of the mobile communication device is able to prevent the background synchronization from proceeding at a future time for which the actual cost of transfer is higher than the calculated cost of transfer. This saves time, money and battery level to the user of the mobile communication device. It also makes the method of background synchronization according to the present invention flexible, as it takes input from users into account.

According to an optional embodiment, the system according to the present invention further comprises:
  a monitoring unit adapted to monitor the behaviour of the user;
  a behaviour memory adapted to store the behaviour; and
wherein the location prediction unit is further adapted to predict the future locations from the behaviour.

In accordance with the present invention, the location of the mobile communication device may be tracked by a monitoring unit and may regularly be stored in a behaviour memory. The system according to the present invention is therefore aware of locations of the user of the mobile communication device, and of the history of the locations and the corresponding times are available in the behaviour memory. This way, the behaviour of the user of the mobile communication device may be used by the location prediction unit when predicting future locations of the mobile communication device at future times. For example, it might be stored in the behaviour memory that a user of the mobile communication device is usually at work from 8:00 AM to 5:00 PM. At lunch, between 12:00 PM and 1:00 PM, the user usually has lunch in a restaurant. Between 7:00 AM and 8:00 AM and 5:00 PM and 6:00 PM, the user sits in a car or in a train, to finally spend the rest of the day usually at home. The behaviour may be different for weekend days and week days. The connection between the cloud storage and the mobile communication device may vary depending on these locations and these times. The prediction of future locations and future times performed by the location prediction unit takes this behaviour into account. Locations and times with the largest probability to be correct based on past behaviour of the user of the mobile communication device are considered during the prediction. This way, experience from the user of the mobile communication device is taken into account in the predictions as feedback and brings credibility to their determination, making them more relevant. As an alternative to behaviour tracking, the user may be requested to enter a schedule from which estimated locations at future times can be derived.

According to an optional embodiment, the cost of transfer according to the present invention is calculated from one or more of the following parameters:
- a size of said application data;
- a type of connection between the mobile communication device and the cloud storage at the future locations and at the future times;
- a usage cost of the type of connection;
- a privacy criteria associated with the type of connection;
- a signal strength of a connection between the mobile communication device and the cloud storage;
- a bandwidth of a connection between the mobile communication device and the cloud storage;
- a battery level of said mobile communication device; and
- a required power for the background synchronization.

According to the present invention, the connection between the mobile communication device and the cloud storage may vary depending on future locations and future times. The cost determination module according to the present invention takes one or more parameters of the connection into account during the calculation of a cost of transfer for each future location and future times. For example, the cost of transfer changes in function of the type of the connection. These parameters may be summed, multiplied, combined in a weighted sum, etc., in order to calculate a cost of transfer. The cost of transfer may be pre-configured or may be made user-configurable in different embodiments of the invention. The mobile communication device and the cloud storage can communicate via Wi-Fi, or 3G or 4G, or Ethernet, etc. The speed of transfer of information achievable for each type of connection may influence the cost of transfer: the slower the connection is, the longer the background synchronization lasts and the higher the cost of the transfer is. Also, the usage cost of the type of connection may have an impact on the cost of transfer. If a user of the mobile communication device uses roaming for background synchronization, this may result in a higher financial cost for the user than if the type of connection was a free and unlimited Wi-Fi connection. Also, the cost of transfer may depend on a privacy criteria of the connection. For example, a Wi-Fi connection might be protected with a password, unknown to the user. The user is therefore not allowed to perform background synchronization until the mobile communication device can communicate with the cloud storage. The longer the absence of synchronization is, the higher the cost of transfer is. The signal strength of the connection may also influence the cost of the transfer. The weaker the signal strength of the connection is, the longer the background synchronization lasts and the higher the cost of transfer is. Also, the bandwidth of the connection may be of importance in the calculation of the cost of transfer. Indeed, if the connection is busy, the background synchronization is lasting longer than expected for the considered type of connection. Therefore, the cost of transfer is higher. Also, the battery level of the mobile communication device may have an impact on the cost of transfer. If the battery level is low, background synchronization needs to be performed rapidly and at low cost. A connection that is slow, busy, and/or protected will be associated with a higher cost of transfer than a connection close by, and/or available. A required power for the considered background synchronization of application data may also influence the cost of transfer. The longer the duration of the connection between the mobile communication device and the synchronization is, the more battery level of the devices will be lost, and the higher the cost of transfer is. Also, the cost of transfer changes in function of the size of application data itself. The larger the amount of data that needs synchronization is, the longer the synchronization is lasting, and/or the more demanding the synchronization in terms of power, cost, price, etc, is. The fact that one or more of these parameters is taken into account during the calculation of a cost of transfer for each predetermined future times allows the identification of a future time when the cost will be the lowest. This saves time and money to the user of the mobile communication device.

According to an optional embodiment, the system according to the present invention further comprises a notification module adapted to notify said user when and where said background synchronization is scheduled.

In accordance to the present invention, the system may notify the user of the mobile communication device of the future time at which the background synchronization is delayed. This way, the process of background synchronization is made transparent to the user of the mobile communication device. The user may send overruling instructions to the system according to the present invention when the future time and/or the future location and/or the calculated cost of transfer are not convenient for him. For example, the user may be aware that the mobile communication device will not be at the predicted location at the future time, and is then able to overrule the synchronization scheduler according to the present invention. The added flexibility to the system according to the present invention prevents the background synchronization from going through at an actual cost higher than originally calculated, which saves time, reduces the financial cost, etc. The notification module according to the present invention may notify the user of the mobile communication device, for example by displaying the future time and location in a pop-up window on the display of the mobile communication device.

According to an optional embodiment, the system according to the present invention is further characterized in that:
- the cost determination module is further adapted to automatically calculate a new cost of transfer for the application data at a new future location and at a new future time when the mobile communication device is not at the predicted location at the future time; and
- the synchronization scheduler is further adapted to schedule the background synchronization at the new future time.

In accordance with the present invention, the synchronization scheduler may schedule the background synchronization at a new future time when the mobile communication device is not at the predicted location at the future time. When the mobile communication device is not at the predicted location at the future time, the synchronization scheduler may suspend the programmed background synchronization, or may prevent it from starting. The cost determination module according to the present invention may calculate new costs of transfer for the predicted future times. This way, the synchronization scheduler may automatically identify a new future time and may delay the background synchronization until this new future time. This reduces the financial cost for the user of the mobile communication device. This also saves time to the user of the mobile communication device who does not need to monitor the schedule of the background synchronization and does not need to manually overrule the synchronization scheduler according to the present invention when the future time is not convenient. The new future location of the mobile communication device may be identical or different to the location of the mobile communication device at the future time.

This way, the monitoring unit according to the present invention may update the behaviour memory of the system. For example, the system according to the present invention may remember that the location of the mobile communication device and the time at which the mobile communication device was at this location. This information may later on be taken into account when scheduling a new background synchronization. This way, even if the synchronization scheduler according to the present invention is overruled by the user of the mobile communication device, the background synchronization can still be performed at a new future time.

According to an optional embodiment, the system according to the present invention is further characterized in that:
the cost determination module is further adapted to periodically re-calculate a cost of transfer for application data; and
the synchronization scheduler is further adapted to re-schedule the background synchronization.

According to the present invention, the risk of going through with a background synchronization with a cost of transfer higher than the predicted one may be reduced by periodically re-calculating the cost of transfer of application data. New costs of transfers based for example on the behaviour of the user of the mobile communication device are periodically calculated to make sure the background synchronization is scheduled at a future time for which the cost of transfer is the lowest. This way, the notification to the user of the mobile communication device may be periodically updated with relevant information. Indeed, if the mobile communication device is not at the predicted location at the future time, the user does not need to overrule the synchronization scheduler manually as the system according to the invention periodically ensures that the background synchronization proceeds at a future time associated with the lowest cost of transfer. This way, even if the synchronization scheduler according to the present invention is overruled by the user of the mobile communication device, the background synchronization can still be performed at a new future time. Also, automatic re-calculation of a cost of transfer may be useful when the background synchronization starts at the future time and a future location, but that the location of the mobile communication device changes during synchronization. This way, the system according to the present invention ensures that the background synchronization systematically proceeds with a minimized cost of transfer.

According to an optional embodiment, the system according to the present invention is further characterized in that:
the information collecting unit is further adapted to calculate a time window indicative for a how long said background synchronization can be postponed;
the location prediction unit is further adapted to predict future locations of the mobile communication device at future times within the time window; and
the synchronization scheduler is further adapted to schedule the background synchronization within the time window at a future time with the lowest cost of transfer.

In accordance with the present invention, the information collecting unit may calculate a time window indicative for how long the background synchronization can be postponed. The time window according to the present invention is equivalent to a deadline before which the background synchronization must be completed. For example, the calculation of the deadline may take the amount of application data to be transferred into account. The location prediction unit according to the present invention predicts future times for synchronization that are within the time window, and that allow the background synchronization to proceed and to be completed within the time window. The synchronization scheduler schedules the background synchronization at a future time within the time window and from which the background synchronization can be completed, still within the time window. This way, the synchronization must not be performed after a certain time, after which the update of the application may be out-dated or not relevant anymore, for instance if a new synchronization of the same application is available. This may deteriorate the experience of the user. Also, if the synchronization scheduler according to the present invention is overruled by the user, the background synchronization can still be performed if there is still time until the deadline.

According to an optional embodiment, the system according to the present invention is further characterized in that the background synchronization can be performed from the mobile communication device to the cloud storage or from the cloud storage to the mobile communication device.

Background synchronization may be scheduled from a mobile communication device to the cloud storage, or from the cloud storage to the mobile communication device. This way, the online content of the application may be regularly updated locally on the device or on the server. Online content is thereby kept up-to-date and relevant. This way, the background synchronization is made simple and fast.

According to a second aspect of the invention, there is provided a method for scheduling background synchronization of application data between a mobile communication device and a cloud storage, the method comprising the steps of:
obtaining or estimating the size of application data;
predicting future locations of the mobile communication device at future times;
calculating a cost of transfer for transferring application data at the future locations and the said future times; and
scheduling the background synchronization at a future time based on cost of transfer, for example, the future time with a lowest cost.

In accordance with the present invention, the cloud storage may for example be a server in the cloud on which application data is stored and from which or to which application data is synchronized. According to the present invention, the mobile communication device may for example be a mobile phone, or a tablet, or a laptop, or any other device with data connectivity. The way the device connects to the Internet may be different. For example, a laptop may use Wi-Fi or Ethernet, while a mobile phone may use Wi-Fi, 3G or 4G connectivity. The mobile communication device is adapted to communicate with the cloud storage. Application data can be stored on the mobile application device and/or on the cloud storage. For example, once an application adds, modifies or deletes content, the content including the changes is synchronized with the cloud storage, and the cloud storage then updates the content on the other associated mobile communication devices. The method according to the present invention may first retrieve the amount of application data that needs synchronizing from the mobile communication device, or from the cloud storage, or from the mobile communication device and the cloud storage. As soon as synchronization of application data is needed, future locations of the mobile communication device at future times are predicted. This prediction is an estimation of the location of the mobile communication device in the future. It may be realized by taking a past behaviour of the user of the mobile communication device into account. For example, the time schedule and the geographical location of the user of the mobile communication device may be monitored. According to the present invention, a probability of times and locations of the mobile communication device may be known based on the monitored behaviour of a user of the mobile communication device, and thereby future times and future locations may be predicted based on this probability. This way, experience from the user of the mobile communication device is taken into account in the predictions as feedback and brings credibility to their determination, making them more relevant.

According to the present invention, a cost of transfer for the background synchronization of application data is calculated when the synchronization is initiated at predetermined and predicted future times predicted. For example, the type connection between the cloud storage and the mobile communication device may vary depending from one predicted time to another, and this make impact the cost of transfer of application data. According to the present invention, the size of application data is further estimated. This way, it is possible to profile and estimate the amount of application data, and to identify requirements for the transfer based on the amount of application data to be transferred. The size of application data may as a consequence be taken into account during the calculation of a cost of transfer. According to the present invention, a future time, out of all the predicted future times, may be identified for which the cost of transfer of the background synchronization of application data is the lowest. This way, the background synchronization of application data is delayed so that it takes place at the time, and the location of the mobile communication device, when the cost associated with the background synchronization is minimized. This way, as the cost of transfer for the user of the mobile communication device is the lowest, several characteristics associated with the background synchronization are minimized, for example the time needed for the transfer, the financial cost of the transfer for the user, the use of the battery level of the mobile communication device and/or the cloud storage, the usage of the bandwidth of both devices, etc.

The current invention in addition also relates to a computer program comprising software code adapted to perform the method according to the present invention.

The invention further relates to a computer readable storage medium comprising the computer program according to the present invention.

DETAILED DESCRIPTION OF EMBODIMENT(S)

Figure 1:
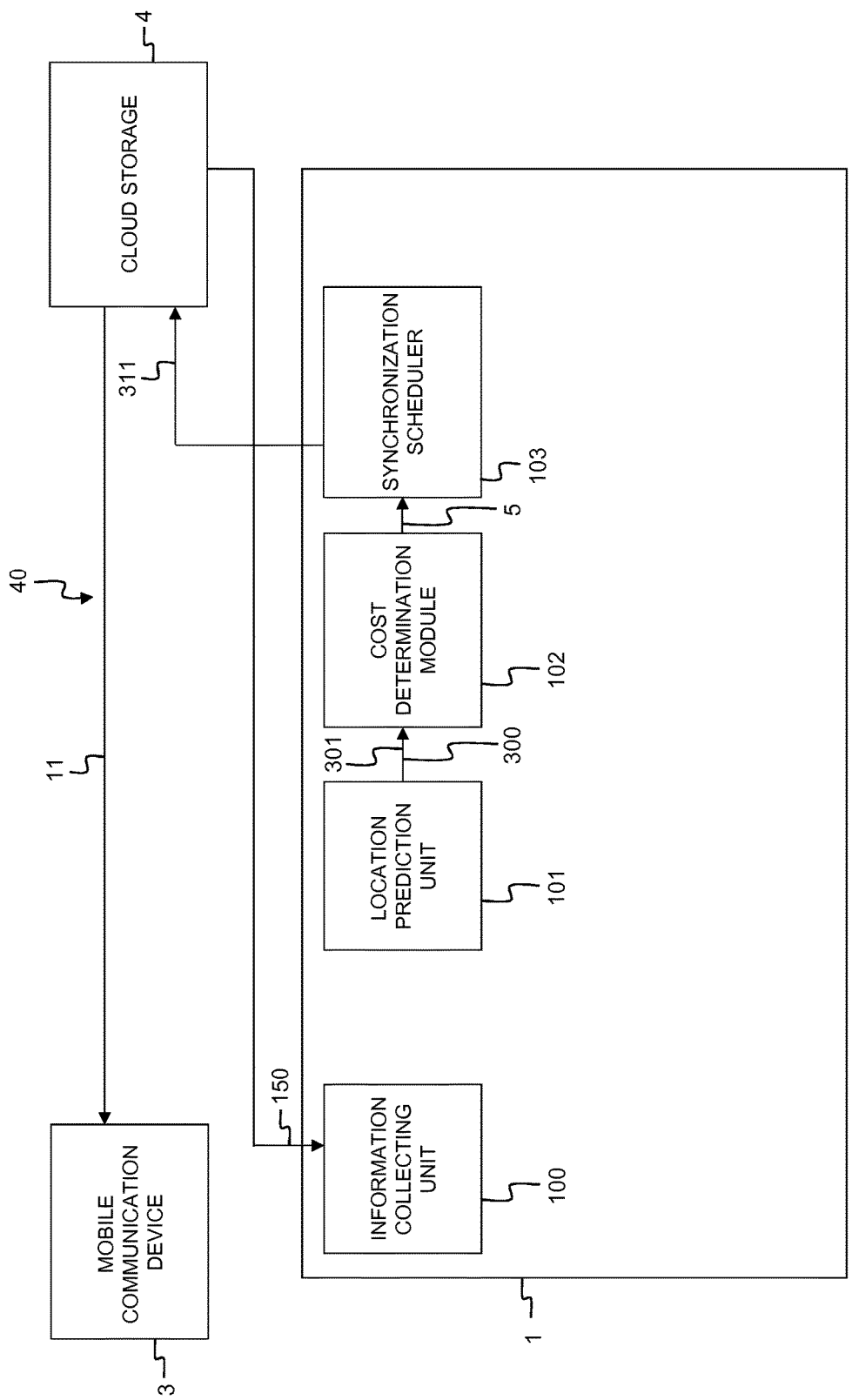
FIG. 1 schematically illustrates an embodiment of a system for scheduling background synchronization of application data from a cloud storage to a mobile communication device.

According to an embodiment shown in FIG. 1, a system 1 comprises a information collecting unit 100, a location prediction unit 101, a cost determination module 102 and a synchronization scheduler 103. The system 1 allows background synchronization of application data 11 from a cloud storage 4 to a mobile communication device 3. The information collecting unit 100 retrieves application data 11 from the cloud storage 4 or at least information indicative for the amount or size 150 of application data 11 to be synchronized. The location prediction unit 101 predicts future locations 300 of the mobile communication device 3. The location prediction unit 101 further predicts future times 301 at which the mobile communication device 3 will be present at the future locations 300. The connection 40 between the cloud storage 4 and the mobile communication device 3 may vary depending on the future locations 300 and the future times 301. The predicted future locations 300 and the corresponding predicted future times 301 are fed as input to the cost determination module 102. The cost determination module 102 calculates a cost of transfer 5 at predetermined times. All the calculated costs of transfer 5 are taken into account by the synchronization scheduler 103. Indeed, the synchronization scheduler 103 identifies the predicted future time 311, out of all the predicted future times 301, for which the cost of transfer 5 is the lowest. The synchronization scheduler further schedules background synchronization of application data 11 at this predicted future time 311, and communicates this scheduled time 311 to the cloud storage 4. This way, background synchronization of application data 11 from the cloud storage 4 and the mobile communication device 3 starts at the scheduled time 311.

Figure 2:
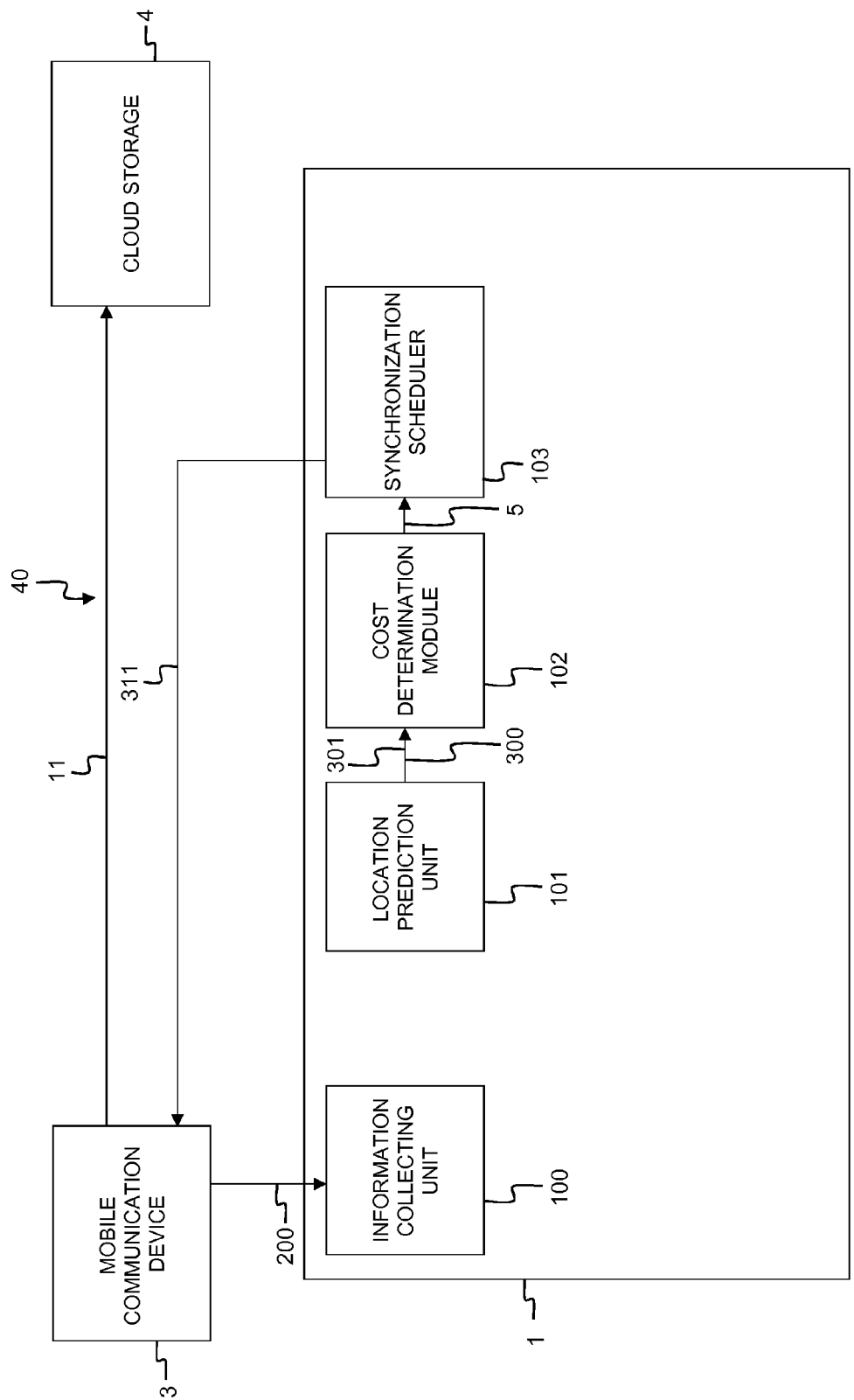
FIG. 2 schematically illustrates the embodiment of the system of FIG. 1, where background synchronization of application data is scheduled from the cloud storage to the mobile communication device.

FIG. 2 shows the system 1 of FIG. 1, when the system 1 allows background synchronization of application data 11 from the mobile communication device 3 to the cloud storage 4. The information collecting unit 100 retrieves application data 11 from the mobile communication device 3 or at least information indicative for the amount or size 200 of application data 11 to be synchronized. The synchronization scheduler further schedules background synchronization of application data 11 at this predicted future time 311, and communicates this scheduled time 311 to the mobile communication device 3.

Figure 3:
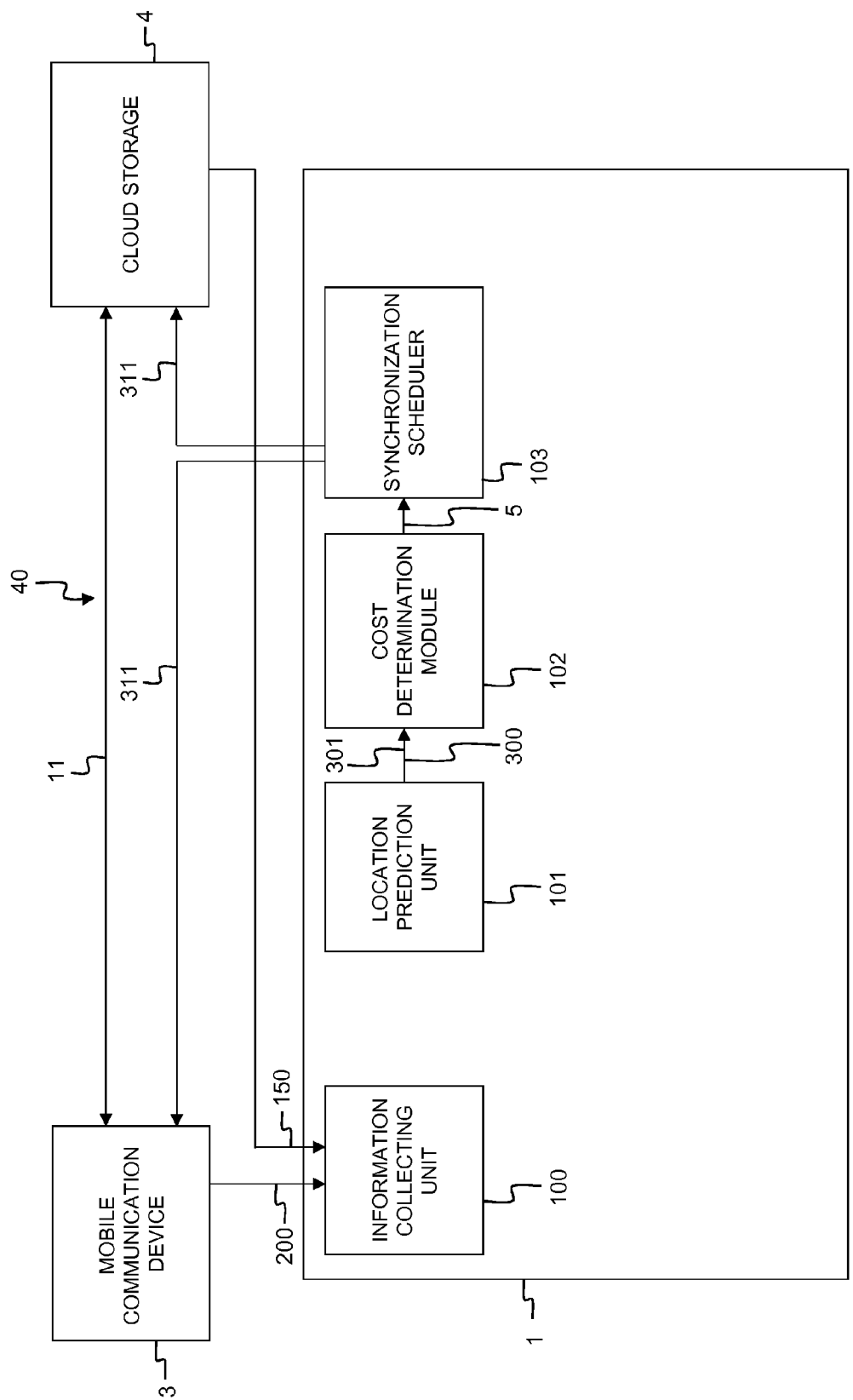
FIG. 3 schematically illustrates the embodiment of the system of FIGS. 1 and 2, where background synchronization of application data is scheduled from the mobile communication device to the cloud storage and background synchronization of application data is scheduled from the cloud storage to the mobile communication device.

FIG. 3 shows the system 1 of FIGS. 1 and 2, when the system 1 allows background synchronization of application data 11 from the mobile communication device 3 to the cloud storage 4 and from the cloud storage 4 to the mobile communication device 3. The information collecting unit 100 retrieves application data 11 from the mobile communication device 3 or at least information indicative for the amount or size 200 of application data 11 to be synchronized, and retrieves application data 11 from the cloud storage 4 or at least information indicative for the amount or size 150 of application data 11 to be synchronized. The synchronization scheduler 103 further schedules background synchronization of application data 11 at this predicted future time 311, and communicates this scheduled time 311 to the mobile communication device 3 and to the cloud storage 4. For example, on FIG. 3, the predicted future time 311 communicated to the mobile communication device 3 and to the cloud storage 4 is identical. It is clear that the future time for background synchronization from the mobile communication device 3 to the cloud storage 4 may also be different from the future time for background synchronization from the cloud storage 4 to the mobile communication device 3.

Figure 4:
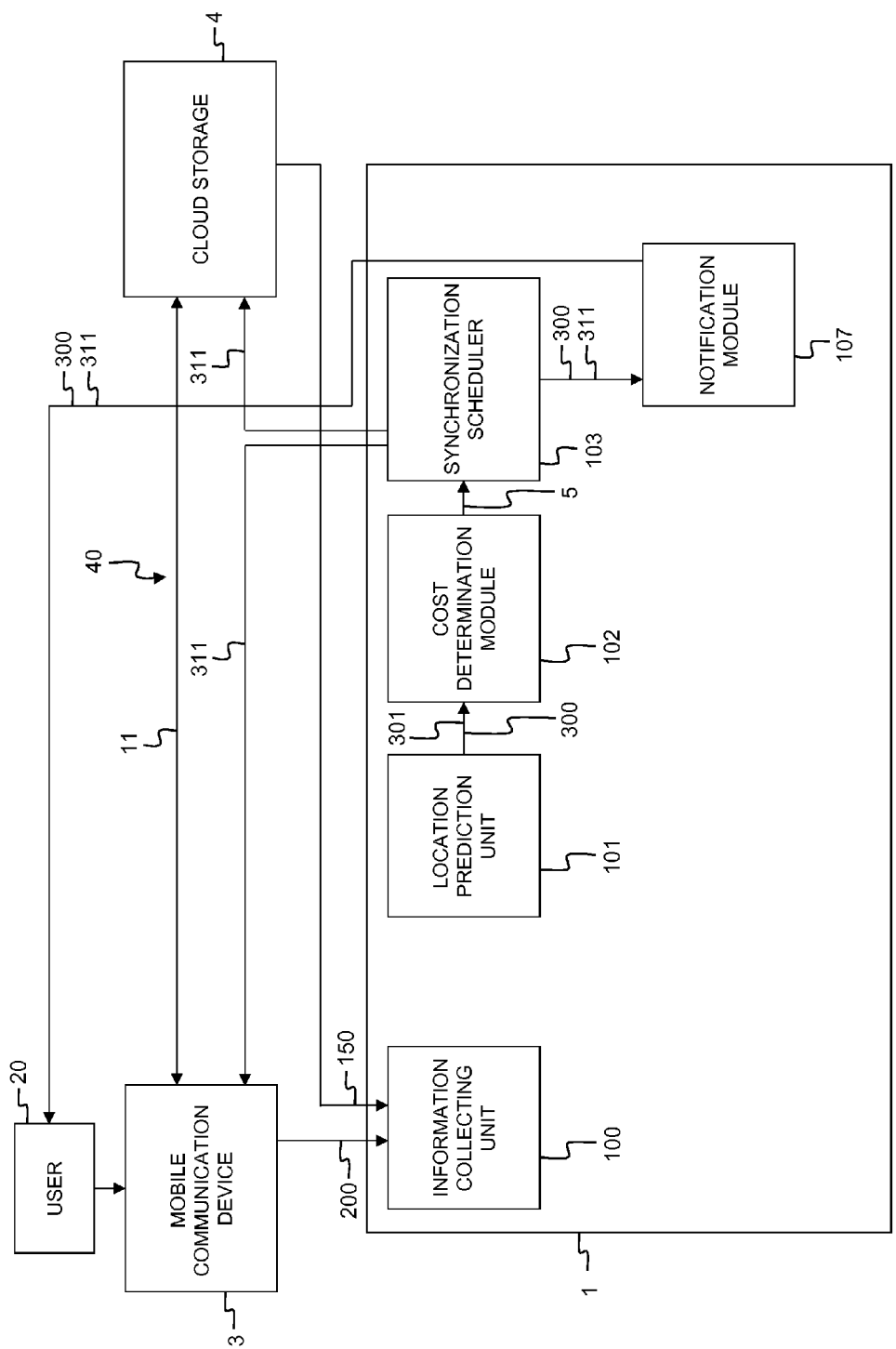
FIG. 4 schematically illustrates an alternative embodiment of a system capable of notifying a user of a mobile communication device of a future time at which a background synchronization is scheduled.

According to an embodiment shown in FIG. 4, a system 1 comprises an information collecting unit 100, a location prediction unit 101, a cost determination module 102, a synchronization scheduler 103 and a notification module 107. Components having identical reference numbers to components in FIG. 1 to FIG. 3 perform the same function. The information collecting unit 100 retrieves application data 11 from the mobile communication device 3 or at least information indicative for the amount or size 200 of application data 11 to be synchronized, and retrieves application data 11 from the cloud storage 4 or at least information indicative for the amount or size 150 of application data 11 to be synchronized. The connection 40 between the cloud storage 4 and the mobile communication device 3 may vary depending on the future locations 300 and the future times 301. The synchronization scheduler 103 schedules background synchronization at a predicted future location 300 and at a predicted future time 311. The notification module 107 may communicate this predicted future location 300 and this scheduled time 311 to a user 20 of the mobile communication device 3, e.g. by displaying this information in a pop-up window on the display of the mobile communication device 3. Alternatively, the notification module 107 may communicate this predicted future location 300 and this scheduled time 311 to the mobile communication device 3.

Figure 5:
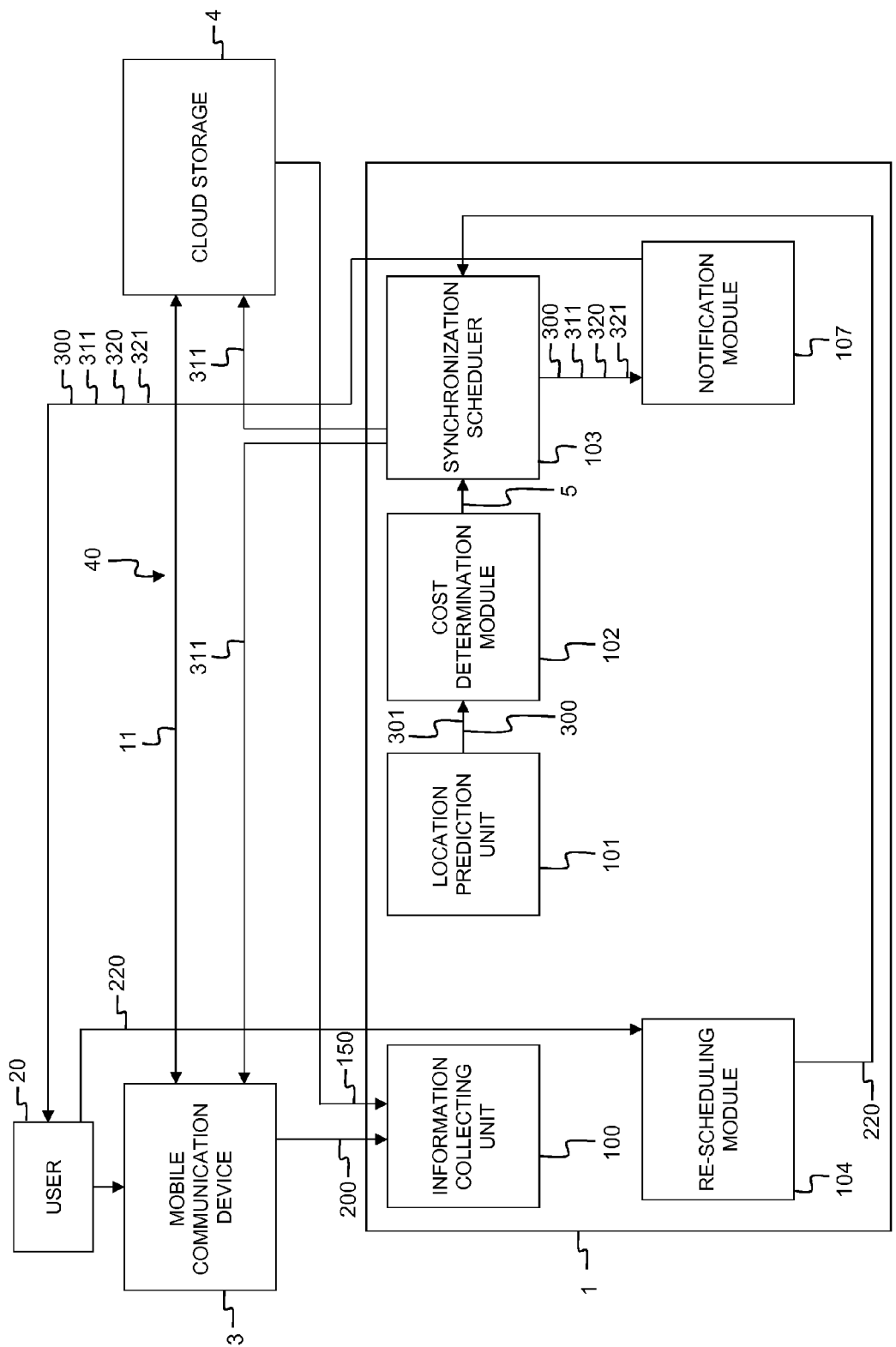
FIG. 5 schematically illustrates an alternative embodiment of a system capable of re-scheduling background synchronization of application data.

According to an embodiment shown in FIG. 5, a system 1 comprises an information collecting unit 100, a location prediction unit 101, a cost determination module 102, a synchronization scheduler 103, a notification module 107 and a re-scheduling module 104. Components having identical reference numbers to components in FIG. 1 to FIG. 4 perform the same function. The information collecting unit 100 retrieves application data 11 from the mobile communication device 3 or at least information indicative for the amount or size 200 of application data 11 to be synchronized, and retrieves application data 11 from the cloud storage 4 or at least information indicative for the amount or size 150 of application data 11 to be synchronized. The connection 40 between the cloud storage 4 and the mobile communication device 3 may vary depending on the future locations 300 and the future times 301. The synchronization scheduler 103 schedules background synchronization at a predicted future location 300 and at a predicted future time 311. The notification module 107 communicates this predicted future location 300 and this scheduled time 311 to a user 20 of the mobile communication device 3, or alternatively to the mobile communication device 3. The user 20 is able to send instructions 220 to the re-scheduling module 104 in order to re-schedule the background synchronization 11 at a time different from the scheduled time 311. For example, if the user 20 is aware that the mobile communication device 3 will not be at the predicted future location 300 at the scheduled time 311, the user can send instructions 220 to re-schedule the background synchronization at a time different from the scheduled time 311. The re-scheduling module 104 communicates the instructions 220 of the user 20 to the synchronization scheduler 103, which takes it into account when scheduling the background synchronization of application data 11 at a new future time 321 different from the scheduled time 311. The notification module 107 may communicate this new future time 321 and this new future location 320 to the user 20 of the mobile communication device 3, or alternatively to the mobile communication device 3. The new future location 320 of the mobile communication device 3, at the new future time 321, may be identical to the location of the mobile communication device 3 at the scheduled time 311, or may be different.

Figure 6:
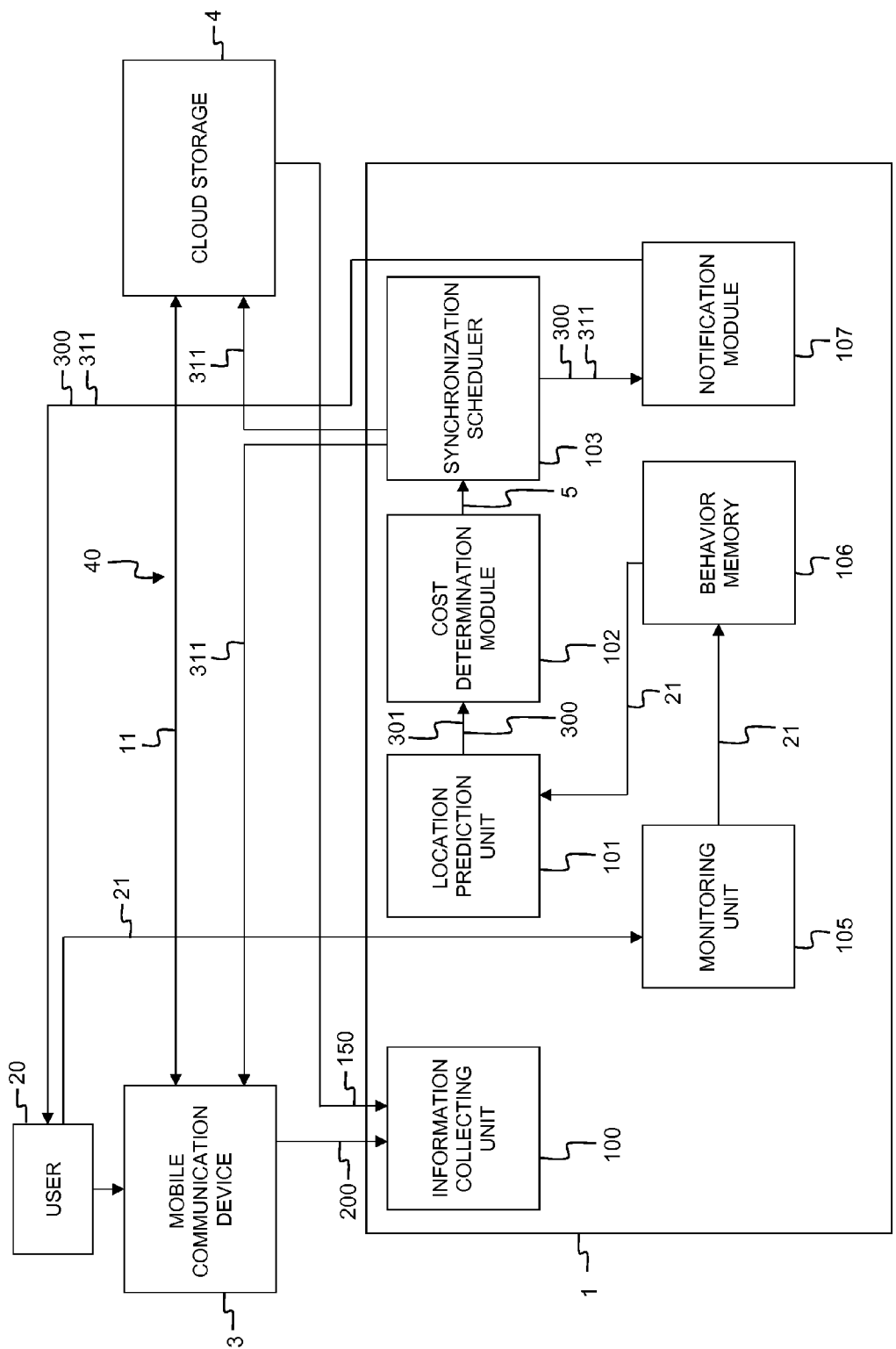
FIG. 6 schematically illustrates an alternative embodiment of a system capable of taking a behaviour of a user of a mobile communication device into account when predicting its future locations.

According to an embodiment shown in FIG. 6, a system 1 comprises an information collecting unit 100, a location prediction unit 101, a cost determination module 102, a synchronization scheduler 103, a notification module 107, a monitoring unit 105 and a behaviour memory 106. Components having identical reference numbers to components in FIG. 1 to FIG. 5 perform the same function. The behaviour 21 of a user 20 of the mobile communication device 3 is monitored by the monitoring unit 105. The location of the mobile communication device 20 is tracked by the monitoring unit 105 and is regularly stored in the behaviour memory 106. The system therefore is aware of locations of the user 20 of the mobile communication device 3 and of his schedule, and the history of the locations and the corresponding times is available in the behaviour memory 106. The behaviour of the user 20 may be used by the location prediction unit 101 when predicting future locations 300 of the mobile communication device 3 at future times 301. For example, it might be stored in the behaviour memory 106 that a user 20 of the mobile communication device 3 is usually at work from 8:00 AM to 5:00 PM. At lunch, between 12:00 PM and 1:00 PM, the user 20 usually has lunch in a restaurant. Between 7:00 AM and 8:00 AM and 5:00 PM and 6:00 PM, the user 20 sits in a car or in the train, to finally spend the rest of the day usually at home. The connection 40 between the cloud storage 4 and the mobile communication device 3 may vary depending on these locations and these times. The prediction of future locations 300 and future times 301 performed by the location prediction unit 101 takes this behaviour 21 into account. Locations and times with the largest probability to be correct based on past behaviour of the user 20 of the mobile communication device 3 are considered during the prediction. The notification module 107 notifies the user 20 of the mobile communication device 3 of the scheduled time 311, and the scheduled location 300 for background synchronization 11. Alternatively, the notification module 107 can modify the mobile communication device 3.

Figure 7:
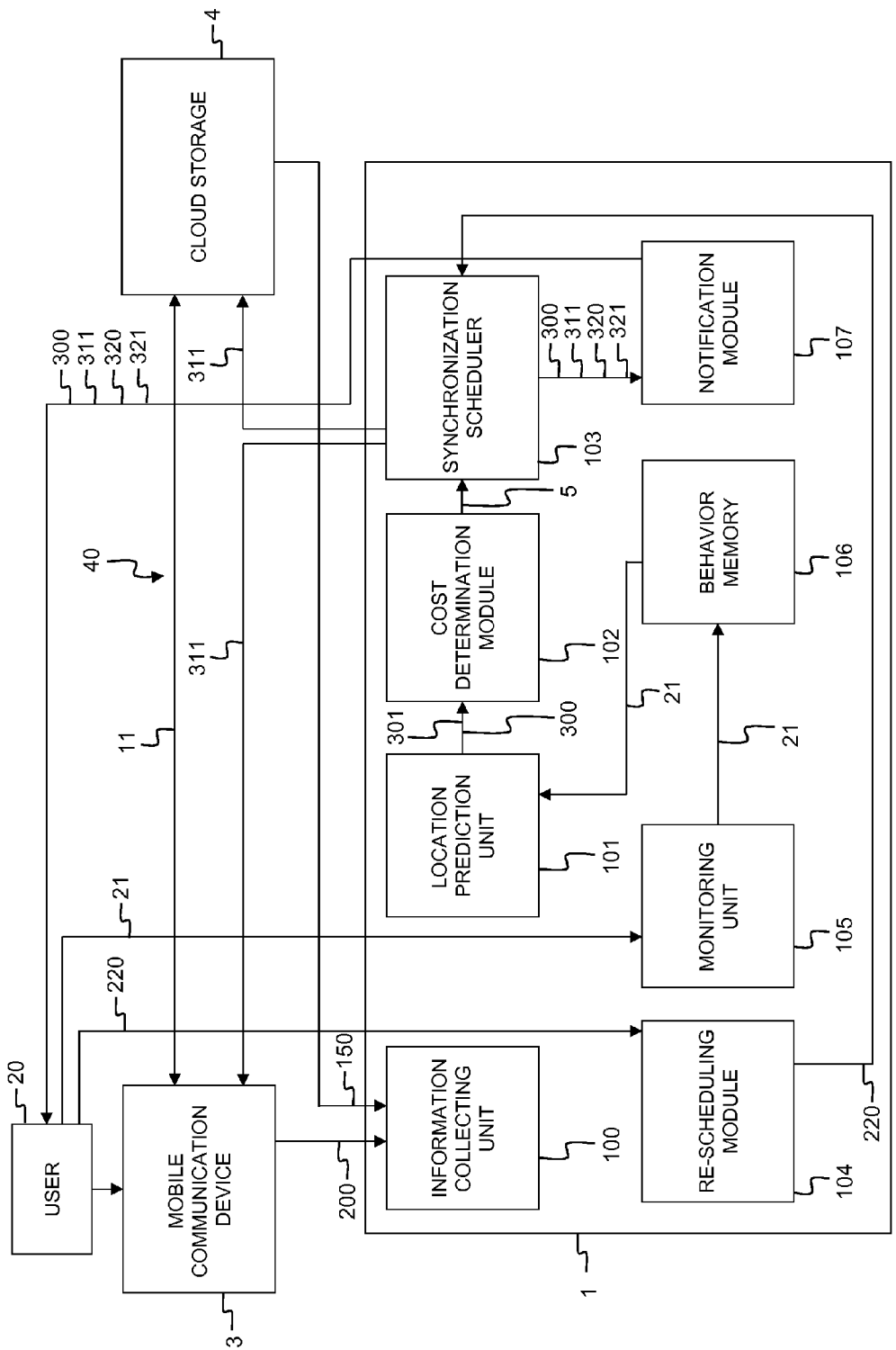
FIG. 7 schematically illustrates an alternative embodiment of a system capable of re-scheduling background synchronization of application data and notifying a user of a mobile communication device of a new future time.

According to an embodiment shown in FIG. 7, a system 1 comprises an information collecting unit 100, a location prediction unit 101, a cost determination module 102, a synchronization scheduler 103, a notification module 107, a monitoring unit 105, a behaviour memory 106 and a re-scheduling module 104. Components having identical reference numbers to components in FIG. 1 to FIG. 6 perform the same function. The behaviour 21 of a user 20 of the mobile communication device 3 is taken into account during the prediction of future locations 300 and future time 301. However, if the scheduled time 311—and therefore the corresponding future location 300—calculated by the synchronization scheduler 103 are not convenient for the user 20, the user 20 may send instructions 220 to the re-scheduling module 104 of the system 1 to re-schedule the synchronization. This way, background synchronization 11 can be re-scheduled to a new future time 321 different from the future time 311 which is more convenient for the user 20 at a new future location 320. The new future location 320 of the mobile communication device 3, at the new future time 321, may be identical to the location of the mobile communication device 3 at the scheduled time 311, or may be different.

Figure 8:
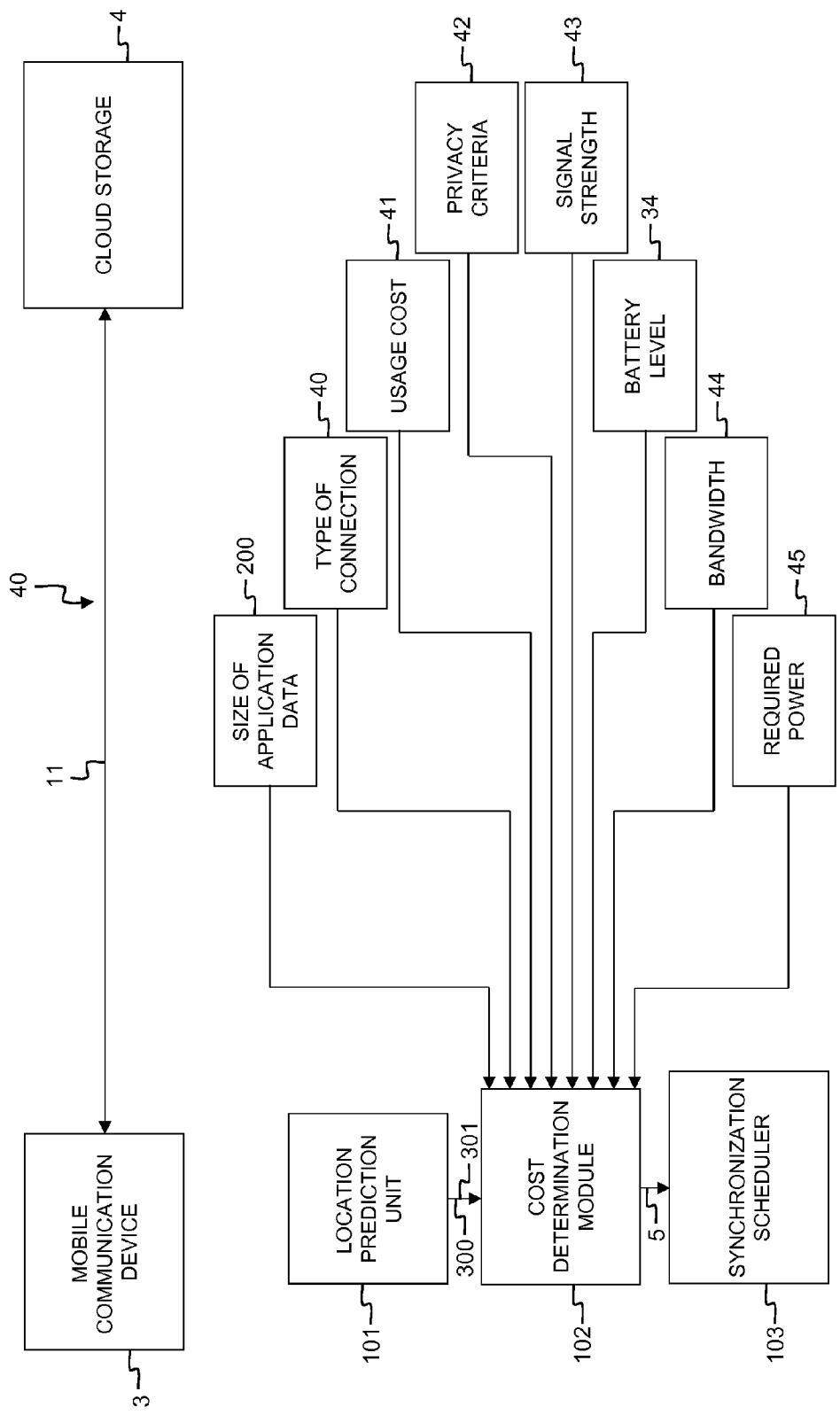
FIG. 8 schematically illustrates an embodiment of parameters taken into account by a system when calculating a cost of transfer of application data.

According to an embodiment shown in FIG. 8, background synchronization is performed between a mobile communication device 3 and a cloud storage 4 with the use of a connection 40. Components having identical reference numbers to components in FIG. 7 perform the same function. The connection 40 may vary depending on the future locations 300 and the future times 301. The cost determination module 102 takes one or more parameters of the connection 40 into account during the calculation of a cost of transfer 5 for each future locations 300 and future times 301. For example, the cost of transfer 5 changes in function of the type of the connection 40. The mobile communication device 3 and the cloud storage 4 can communicate via by a subset of access technologies such as Wi-Fi, or 3G or 4G, be roaming, etc. The speed of transfer of information achievable for each type of connection may influence the cost of transfer 5: the slower the connection 40 is, the longer the background synchronization lasts and the higher the cost of the transfer 5 is. Also, the usage cost 41 of the type of connection 40 may have an impact on the cost of transfer 5. Different types of connection 40 may be associated with different quotas for the user 20 of the mobile communication device 3. Different types of connection 40 may also associated with different costs for the user 20. For example, this may result in a higher financial cost for the user 20 than if the type of connection 40 was a free and unlimited Wi-Fi connection. Also, the cost of transfer 5 may depend on a privacy criteria of the connection 40. For example, a Wi-Fi connection might be protected with a password, unknown to the user 20. The user 20 is therefore not allowed to perform background synchronization until the mobile communication device 3 can communicate with the cloud storage 4. The longer the absence of synchronization is, the higher the cost of transfer 5 is. The signal strength of the connection 40 may also influence the cost of the transfer 5. The weaker the signal strength 43 of the connection 40 is, the longer the background synchronization lasts and the higher the cost of transfer 5 is. Also, the bandwidth 44 of the connection 40 may be of importance in the calculation of the cost of transfer 5. Indeed, if the connection 40 is busy, the background synchronization is lasting longer than expected for the considered type of connection 40. Therefore, the cost of transfer 5 is higher. Also, the battery level 34 of the mobile communication device 3 may have an impact on the cost of transfer 5. If the battery level 34 is low, background synchronization needs to be performed rapidly and at low cost. A connection 40 that is slow, busy, and/or protected will be associated with a higher cost of transfer 5 than a connection 40 close by, and/or available. A required power 45 for the considered background synchronization of application data 11 may also influence the cost of transfer 5. The longer the duration of the connection 40 between the mobile communication device 3 and the synchronization 4 is, the more battery level of the devices will be lost, and the higher the cost of transfer 5 is. Also, the cost of transfer 5 changes in function of the size of application data 2 itself. The larger the amount of data 150; 200 that needs synchronization is, the longer the synchronization is lasting, and/or the more demanding the synchronization in terms of power, cost, price, etc, is.

Figure 9:
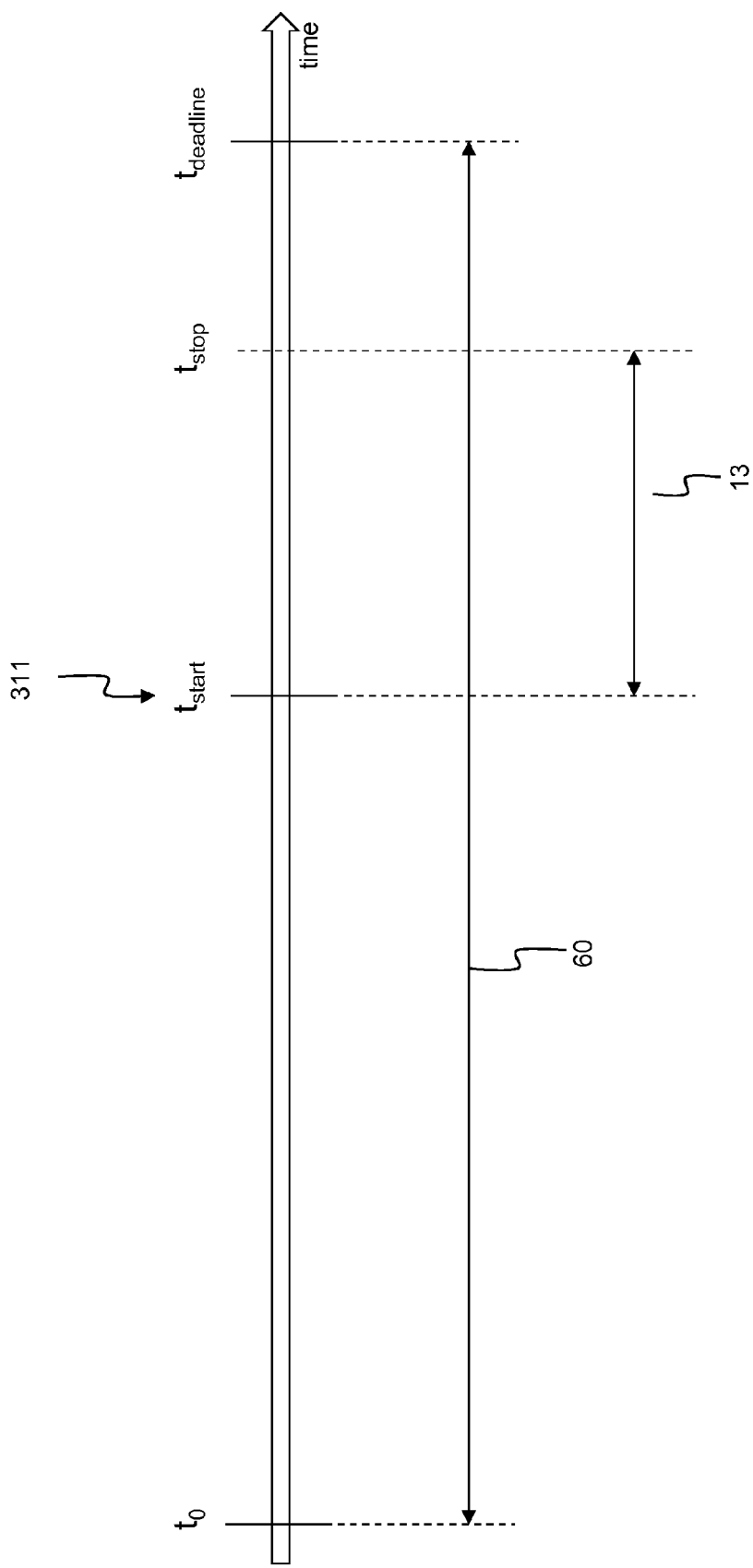
FIG. 9 schematically illustrates an embodiment of a timeline within which a time window is calculated and a background synchronization is scheduled and performed.

According to an embodiment shown in FIG. 9, a timeline depicts a background synchronization 13 of application data 11. From $t_0$, there is need for background synchronization 13 of application data 11. The information collecting unit 100 of the system 1 from FIGS. 1 to 8 further calculates a time window 60 indicative for how long the background synchronization 11 can be postponed. The time window 60 is equivalent to a deadline before which background synchronization 13 must be completed, indicated as $t_{deadline}$ on FIG. 9. The location prediction unit 101 of the system 1 from FIGS. 1 to 8 further predicts future locations 300 of the mobile communication device 3 at future times 301 within the time window 60 so that background synchronization 13 of application data 11 can be performed within the time window 60. The synchronization scheduler 103 of the system 1 from FIGS. 1 to 8 further schedules the background synchronization 13 within the time window 60 at a future time 311 with the lowest cost of transfer 5. Synchronization starts within the time window 60 at $t_{start}$, and finishes within the time window 60 at $t_{stop}$.

Figure 10:
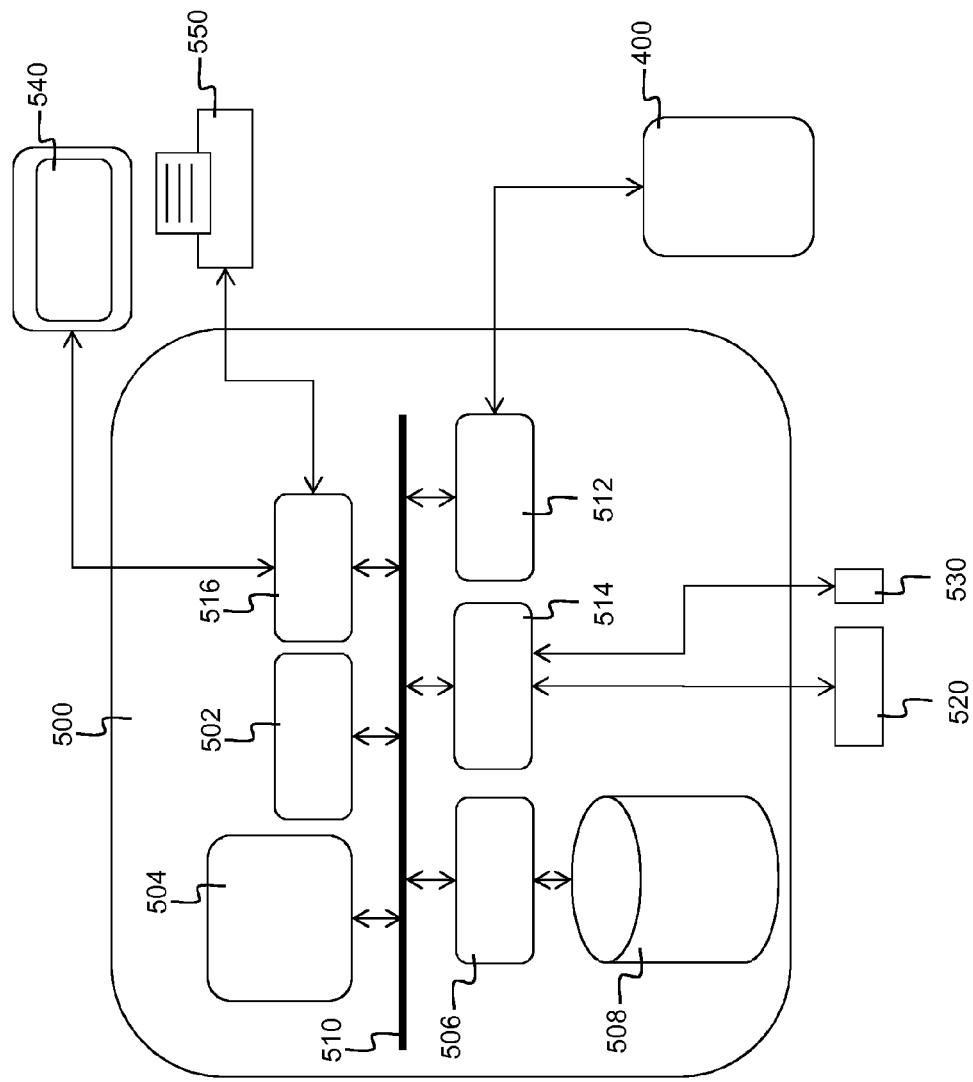
FIG. 10 schematically illustrates a suitable computing system for hosting the system of FIGS. 1, 2 and 3.

FIG. 10 shows a suitable computing system 500 for hosting the system 1 of FIGS. 1 to 8. Computing system 500 may in general be formed as a suitable general purpose computer and comprise a bus 510, a processor 502, a local memory 504, one or more optional input interfaces 514, one or more optional output interfaces 516 a communication interface 512, a storage element interface 506 and one or more storage elements 508. Bus 510 may comprise one or more conductors that permit communication among the components of the computing system. Processor 502 may include any type of conventional processor or microprocessor that interprets and executes programming instructions. Local memory 504 may include a random access memory (RAM) or another type of dynamic storage device that stores information and instructions for execution by processor 502 and/or a read only memory (ROM) or another type of static storage device that stores static information and instructions for use by processor 504. Input interface 514 may comprise one or more conventional mechanisms that permit an operator to input information to the computing device 500, such as a keyboard 520, a mouse 530, a pen, voice recognition and/or biometric mechanisms, etc. Output interface 516 may comprise one or more conventional mechanisms that output information to the operator, such as a display 540, a printer 550, a speaker, etc. Communication interface 512 may comprise any transceiver-like mechanism such as for example two 1 Gb Ethernet interfaces that enables computing system 500 to communicate with other devices and/or systems, for example mechanisms for communicating with one or more other computing systems 400. The communication interface 512 of computing system 500 may be connected to such another computing system by means of a local area network (LAN) or a wide area network (WAN, such as for example the internet, in which case the other computing system 580 may for example comprise a suitable web server. Storage element interface 506 may comprise a storage interface such as for example a Serial Advanced Technology Attachment (SATA) interface or a Small Computer System Interface (SCSI) for connecting bus 510 to one or more storage elements 508, such as one or more local disks, for example 1 TB SATA disk drives, and control the reading and writing of data to and/or from these storage elements 508. Although the storage elements 508 above is described as a local disk, in general any other suitable computer-readable media such as a removable magnetic disk, optical storage media such as a CD or DVD, -ROM disk, solid state drives, flash memory cards, . . . could be used.

The system 1 of FIGS. 1 to 8 can be implemented as programming instructions stored it local memory 504 of the computing system 500 for execution by its processor 502. Alternatively system 1 of FIGS. 1 to 8 could be stored on the storage element 508 or be accessible from another computing system 400 through the communication interface 512.

Typically, the system 1 may be realized in software, or hardware or as a combination of thereof as part of a mobile communication device 3 and/or of a cloud storage 4. The present invention can also be realized by a method executed by software installed on a mobile communication device 3 and/or on a cloud storage 4.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A system for scheduling background synchronization of application data between a mobile communication device and a cloud storage, said system comprising:

an information collecting unit adapted to obtain or estimate the size of said application data;

a location prediction unit adapted to predict future locations of said mobile communication device at future times;

a cost determination module adapted to calculate a cost of transfer for transferring said application data at said future locations and at said future times;

a synchronization scheduler adapted to schedule said background synchronization at a future time based on cost of transfer;

wherein said cost determination module is further adapted to automatically calculate a new cost of transfer for said application data at a new future location and at a new future time when said mobile communication device is not at the predicted location at said future time; and said synchronization scheduler is further adapted to schedule said background synchronization at said new future time.

2. A system according to claim 1, said system further comprising:

a rescheduling module adapted to receive overruling instructions from a user of said mobile communication device to reschedule said background synchronization at a time different from said future time.

3. A system according to claim 1, said system further comprising:

a monitoring unit adapted to monitor behaviour of said user;

a behaviour memory adapted to store said behaviour; and wherein said location prediction unit is further adapted to predict said future times and said future locations from said behaviour.

4. A system according to claim 1, wherein said cost of transfer is calculated from one or more of the following parameters:

the size of said application data;

a type of connection between said mobile communication device and said cloud storage at said future locations and at said future times;

usage cost of said type of connection;

privacy criteria associated with said type of connection;

signal strength of a connection between said mobile communication device and said cloud storage;

bandwidth of a connection between said mobile communication device and said cloud storage;

battery level of said mobile communication device; and required power for said background synchronization.

5. A system according to claim 1, said system further comprising a notification module adapted to notify said user when and where said background synchronization of said application data is scheduled.

6. A system according to claim 1, wherein:

said cost determination module is further adapted to periodically recalculate a cost of transfer for said application data; and said synchronization scheduler is further adapted to re-schedule said background synchronization.

7. A system according to claim 1, wherein:

said information collecting unit is further adapted to calculate a time window indicative for a how long said background synchronization can be postponed;

said location prediction unit is further adapted to predict future locations of said mobile communication device at future times within said time window; and said synchronization scheduler is further adapted to schedule said background synchronization within said time window at a future time with the lowest cost of transfer.

8. A system according to claim 1, wherein said background synchronization can be performed from said mobile communication device to said cloud storage or from said cloud storage to said mobile communication device.

9. A method for scheduling background synchronization of application data between a mobile communication device and a cloud storage, said method comprising:
   obtaining or estimating the size of said application data;
   predicting future locations of said mobile communication device at future times;
   calculating a cost of transfer for transferring said application data at said future locations and at said future times;
   scheduling said background synchronization at a future time based on cost of transfer;
   automatically calculating a new cost of transfer for said application data at a new future location and at a new future time when said mobile communication device is not at the predicted location at said future time; and
   scheduling said background synchronization at said new future time.

10. A computer readable storage medium comprising computer-executable instructions which, when executed by a computing system, perform a method according to claim 9.

* * * * *